June 10, 1930.                    J. SLEPIAN                    1,763,196
                              INSULATOR STRING
                           Filed Sept. 19, 1922
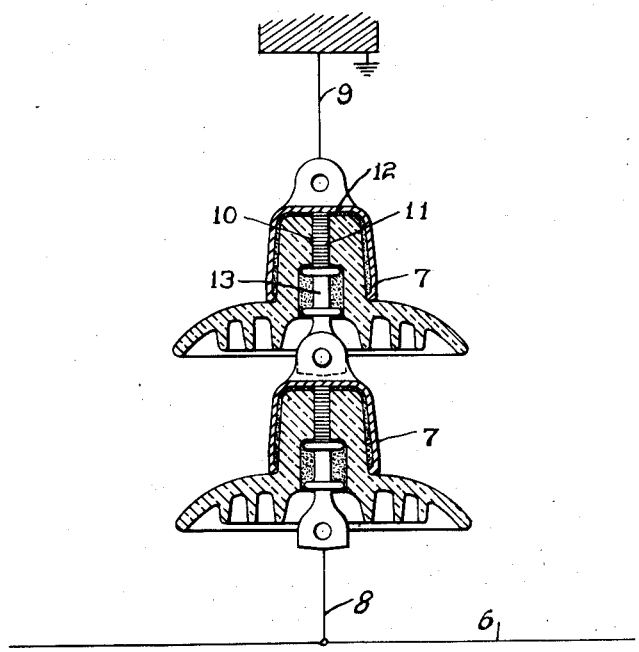
WITNESSES:                                              INVENTOR
                                                     Joseph Slepian
                                                          BY
                                                              ATTORNEY Patented June 10, 1930

1,763,196

UNITED STATES PATENT OFFICE

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA

INSULATOR STRING

Application filed September 19, 1922. Serial No. 589,136.

This invention relates to protective devices and it has particular relation to voltage-distributing means for balancing the voltages across the individual members of a string of insulators.

When a plurality of series-connected electrical units are subjected to a difference of potential, it is generally desirable to utilize one or more shunting balancing devices in order to protect one or more of such units from the effects of excessive voltages. In some such applications, it has been proposed to utilize rods of high-resistance material, having a resistance which is of the same order of magnitude as the serially connected units to be protected, so as to be able to balance the voltages across said units. However, difficulty has been experienced in securing sufficient uniformity of material to accomplish the desired result. If rods of sufficiently low resistance to ensure uniformity are employed, a continual leakage loss is encountered.

My invention is designed to obviate the above-mentioned difficulties, it being among the objects thereof to provide a balancing device of the lightning-arrester type, which shall have a critical break-down voltage and a relatively high leakage resistance, and which shall be uniform and adapted to quantity production.

It is a further object of my invention to provide a balancing device which shall be capable of allowing a relatively heavy current to pass therethrough at any predetermined critical voltage and which shall prevent any substantial amount of current from passing therethrough below said predetermined critical voltage.

In practising my invention, I preferably provide a balancing device of a type which I have called an autovalve, since it automatically operates as a valve permitting a glow-discharge flow of current when, and only when, a predetermined critical voltage is reached. The autovalve device, per se, is described and claimed in my Patent No. 1,509,493 for Lightning arresters. The autovalve protective device comprises a plurality of plates of high-resistance material which, in my present application, are connected in shunt to the unit to be protected. In operation, as long as the voltage across the autovalve balancing device is below the breakdown voltage thereof, substantially no current passes therethrough, owing to the extremely high leakage resistance thereof. Since my stack of high-resistance autovalve plates passes substantially no leakage current, in normal operation, its conductivity is of the same order of magnitude as an insulator, which is defined as a substance conducting substantially no current when voltage is applied thereto. But when the critical voltage of my autovalve balancing device is exceeded, a glow discharge takes place between the several plates thereof, causing the balancing device to break down and to pass current freely. By reason of the high resistivity of the plates, the discharge is prevented from concentrating as an arc, but it is spread out in the form of a glow discharge which is immediately interrupted when the voltage is reduced below the critical value.

In the accompanying drawings constituting a part hereof and in which like reference characters indicate like parts, the single figure is a cross-sectional view of a string of insulators embodying my invention.

In the past it has been found that, in insulator strings, it sometimes occurs that a unit does not absorb its proportion of the impressed voltage, thereby subjecting the remaining units to excessive voltage. This often results in undue heating of the remaining units, whereby they become damaged and perhaps destroyed.

According to my invention, each of the insulator units is provided with a balancing device connected in shunt thereto. Each of the balancing devices consists of plates of high-resistance material placed in contact with each other, as set forth in my above-mentioned patent, or separated slightly by suitable spacers, such as 3-mil mica strips, as set forth in my Patent No. 1,509,497 for Spark gap structures. Separation of the plates may be effected by other means, such as ridges or ribs on the surfaces of adjacent plates, as set forth in my Patent No. 1,509,494 for Disk structures.

In operation, if one of the units of the insulator string does not carry its proportion of the voltage, one or more of the remaining units will be subjected to a voltage which is of such order that it exceeds the break-down voltage of the protective device shunted thereacross. This results in the breakdown of the protective device which then passes a glow-discharge current which very rapidly increases in magnitude as the excess of voltage increases. The increased current passing through the remaining units increases the voltage drop in the same, and reduces the voltage across the unit or units which are thus protected against excess voltages by the discharge of the protective device.

Referring to the embodiment of the invention shown in the drawing, my invention is applied to an insulator string which often becomes dirty and then is wetted by rain, fog, dew or the like, causing the surface thereof to become partially conducting. This may cause an excessive voltage to appear on one or more insulators and thus cause flash over. By the provision of my balancing device, I may avoid this undesirable effect.

As shown in the drawing, a string of insulators 7 may be connected to a line conductor 6 by a conductor 8 and to ground by a conductor 9. Each insulator 7 is provided with a cylindrical chamber 10 in which is located a balancing device 11 comprising stacked plates of high-resistance material, the end plates being respectively in contact with the cap 12 and the pin 13 of the insulator. The breakdown voltage of the balancing devices 11 is so calculated that it is somewhat less than the flashover voltage of the insulators 7 when dirty.

I have found, to cite merely one illustrative example, that disks of high-resistance material having a specific resistance of several thousand ohms per centimeter cube, $\frac{1}{32}$ of an inch thick and $\frac{1}{8}$ of an inch in diameter give good results in a structure of this kind. The significance of these figures will be evident when it is remembered that the resistivity of copper is .0000017 ohm per centimeter cube, or of the order of $10^{-6}$ ohm; the resistivity of carbon is .0035 ohm per centimeter cube, or of the order of $10^{-3}$ ohm; and the resistivity of a specific example of a disc used in my invention is several thousand ohms per centimeter cube, or of the order of $10^3$ ohms. The expression, "of the order of" $10^{-6}$, $10^{-3}$ or $10^3$, respectively, in this specification and in the appended claims, simply means that the quantity in question is conveniently measured in units of the size designated.

In operation, when the voltage across any insulator 7 exceeds the breakdown voltage of the balancing device 11, discharge of the excess voltage takes place through said balancing device 11, thereby maintaining the proper voltages on each of the insulators and preventing flash over.

Although I have described a preferred embodiment of my invention, it is to be understood that the invention is not limited to this specific example. It is obvious that there are numerous other applications of the invention, those suggested in the description being for the purpose of exemplification only.

I claim as my invention:

1. An insulator string comprising a plurality of insulator units, each unit having conducting terminal parts separated by an insulating member, the insulating member of each of said units being provided with a perforation extending therethrough from one conducting terminal to the other, and balancing means for insuring the maintenance of a proper voltage distribution between the several units, said balancing means being located in each of said perforations and comprising a stack of plates having a resistance of the order of an insulator but yet sufficiently low to pass a leakage current sufficient to effect the aforesaid balancing of the unit voltages, and having the further property, when a predetermined critical excessive voltage is exceeded, of passing current discharges with comparative freedom and of returning to its normal high-resistance state when normal voltage conditions are restored.

2. An insulator string comprising a plurality of insulator units, each unit having conducting terminal parts separated by an insulating member, and balancing means for insuring the maintenance of a proper voltage distribution between the several units, said balancing means comprising a resistor element shunted across the entire insulator string and in electrical connection, at intermediate points, with the respective intermediate terminal parts of the several units, the resistance of said resistor element under normal conditions being of the order of an insulator but yet sufficiently low to pass a leakage current sufficient to effect the aforesaid balancing of the unit voltages, and one or more sections of said resistor element having the further property, when a predetermined critical excessive voltage, less than the breakdown voltage of the associated insulator unit, is exceeded, of passing current discharges with comparative freedom and of returning to its normal high-resistance state when normal voltage conditions are restored.

3. A device including electrical elements in series and a resistor element shunted across the entire series of electrical elements and in electrical connection, at intermediate points, with the respective intermediate terminal members of the several electrical elements, the resistance of said resistor element under normal voltage conditions being of the same order of magnitude as the resistance of said series of electrical elements, and one or more sections of said resistor element having the further property, when a predetermined critical excessive voltage is exceeded, of passing current discharges with comparative freedom and of returning to its normal high-resistance state when normal voltage conditions are restored.

4. A multi-unit insulator comprising a plurality of insulator units having conducting terminal parts separated by an insulating member, the insulating member of each of said units being provided with a perforation extending therethrough from one conducting terminal to the other, and a protective device located in said perforation and having its terminals connected to the terminals of the insulator unit, said protective device comprising a stack of plates including plates having a resistivity of the order of $10^3$ ohms per centimeter cube.

5. An insulator unit having conducting terminal parts separated by an insulating member, said insulating member being provided with a perforation extending therethrough from one conductor terminal to the other, and a protective device located in said perforation and having its terminals connected to the terminals of the insulator unit, said protective device comprising a stack of plates including plates having a resistivity of at least several thousand ohms per centimeter cube.

6. An insulator comprising a plurality of serially connected insulator units, each unit having integrally attached conducting terminal parts separated by an insulating member, characterized by the fact that each insulating member is provided with means in its central portion, extending therethrough from one conducting terminal to the other, for providing a discharge path which becomes conducting when a predetermined critical excessive voltage is exceeded and which becomes substantially non-conducting, but more conducting than the insulating member, when the excessive voltage is reduced to a value corresponding approximately to the normally expectable voltage across that unit.

In testimony whereof, I have hereunto subscribed my name this 13th day of September, 1922.

JOSEPH SLEPIAN.